United States Patent
Persky et al.

(10) Patent No.: US 6,497,362 B2
(45) Date of Patent: Dec. 24, 2002

(54) METHOD AND APPARATUS FOR WIRELESS ASSISTANCE FOR SELF-SERVICE CHECKOUT

(75) Inventors: Michael Persky, New Canaan, CT (US); Norman Tsang, Westport, CT (US); Robert Costello, Katonah, NY (US); Scott Martin, Ponte Verde, FL (US); Derek Williams, Jacksonville, FL (US)

(73) Assignee: New Check Corporation, Jacksonville, FL (US)

( * ) Notice: Subject to any disclaimer, the term of this patent is extended or adjusted under 35 U.S.C. 154(b) by 0 days.

(21) Appl. No.: 09/784,656

(22) Filed: Feb. 15, 2001

(65) Prior Publication Data

US 2002/0148896 A1 Oct. 17, 2002

(51) Int. Cl.[7] ............................................... G06K 15/00
(52) U.S. Cl. ...................... 235/383; 235/385; 235/380; 235/379; 235/462.25
(58) Field of Search ................................ 235/383, 385, 235/472.01, 462.25, 380, 379, 377

(56) References Cited

U.S. PATENT DOCUMENTS

| | | | |
|---|---|---|---|
| 4,676,343 A | 6/1987 | Humble et al. | 186/61 |
| 4,766,296 A | 8/1988 | Barth | 235/383 |
| 4,940,116 A | 7/1990 | O'Connor et al. | 186/61 |
| 4,964,053 A | 10/1990 | Humble | 364/466 |
| 5,083,638 A | * 1/1992 | Schneider | 177/25.15 |
| 5,115,888 A | * 5/1992 | Schneider | 186/61 |
| 5,311,969 A | 5/1994 | Dickover et al. | 186/61 |
| 5,340,970 A | 8/1994 | Wolfe, Jr. et al. | 235/383 |
| 5,424,521 A | 6/1995 | Wolfe, Jr. et al. | 235/383 |
| 5,754,655 A | * 5/1998 | Hughes et al. | 235/380 |
| 5,992,570 A | 11/1999 | Walter et al. | 186/36 |
| 6,199,753 B1 | * 3/2001 | Tracy et al. | 235/375 |
| 6,244,513 B1 | * 6/2001 | Schlieffers et al. | 235/462.45 |
| 6,296,185 B1 | * 10/2001 | Dejaeger | 235/383 |
| 6,347,137 B1 | * 2/2002 | Mason | 186/61 |

FOREIGN PATENT DOCUMENTS

EP 000623904 A1 * 9/1994

* cited by examiner

*Primary Examiner*—Karl D. Frech
*Assistant Examiner*—D I Walsh
(74) *Attorney, Agent, or Firm*—Mintz, Levin, Cohn, Ferris, Glovsky & Popeo PC; Richard G. Gervase, Esq.; Brian P. Hopkins, Esq.

(57) ABSTRACT

A method of performing a supervisory function for a self-checkout system including sending a request for supervisory assistance from a self-checkout system to a portable, handheld wireless terminal, receiving the request by the wireless terminal, presenting the request via a display provided with the wireless terminal to a supervisory individual, determining whether the assistance request can be remotely performed through input by the supervisory individual, responding to the request through input by the supervisory individual. The input results in a response being sent from the wireless terminal to the self-checkout system. The response results in the supervisory assistance being performed when the assistance request is remotely performable, and the response results in a notification that supervisory personnel are being dispatched to a location of the self-checkout system when the assistance request can not be remotely performed.

46 Claims, 7 Drawing Sheets

METHOD AND APPARATUS FOR WIRELESS ASSISTANCE FOR SELF-SERVICE CHECKOUT

BACKGROUND OF THE INVENTION

1. Field of the Invention

The present invention relates to a self-service checkout system, and more particularly to a wireless handheld terminal which allows for wireless assistance and maintenance for a self-service checkout system.

2. Background of the Related Art

Self-service has benefited consumers and retailers alike. Such systems have been widely adopted for purchasing gasoline at self-service service stations and are now becoming more widely available in retail stores.

Purchasing consumer goods using self-checkout systems, however, often involves more potential problems than self-service purchasing of gasoline. Since self-checkout systems use scanning devices for reading UPC codes, problems associated in scanning, including associated database errors regarding information on products stored in a store's computer system, may occur which greatly reduces the effectiveness, efficiency and ease of use of retail self-checkout systems. Moreover, products which are purchased by weight (e.g., meats, cheese and salads) are also susceptible to additional errors from electronic scaling devices. A shopper's only recourse in responding to these problems using a self-checkout system consists of either rescanning the item, waiting for supervisory personnel assistance, or abandoning the purchase of the item.

Another problem with existing self-checkout systems is the purchase of age-restricted items. In order to restrict the sales of these items to people of legal age, stores generally must setup separate pay areas or position supervisory personnel at the checkout areas, so that store personnel can properly validate a shopper's age.

Maintenance for self-checkout systems is yet another problem. Peripheral devices including, for example, printing modules, magnetic swipe reading devices, cash acceptance devices (bill readers and coin acceptors), and cash dispensing devices may require maintenance at any time due to random errors and changes in customer volume over a period of time. Thus, maintenance may be required during a shopping transaction, resulting in shoppers having to wait until supervisory personnel can be dispatched to the self-checkout lane to perform the required maintenance.

The above listed problems all result in slower purchasing and throughput times, lowering the sales volume for store owners and requiring shoppers to spend more time waiting in line.

SUMMARY OF THE INVENTION

Thus, it is an object of the present invention to provide status, assistance and maintenance communications wirelessly from a self-checkout system to remotely positioned supervisory personnel via a wireless terminal.

It is yet another object of the present invention to provide responses to status, assistance and maintenance communications from supervisory personnel to a self-checkout apparatus from any location within a store via a wireless terminal.

It is yet a further object of the present invention to provide wireless terminals for performing point-of-sale functions. For example, the wireless terminal according to the present invention includes a UPC scanner so that supervisory personnel can add items or include coupons (or any other UPC coded object) to a transaction conducted on a self-checkout system apart from scanning provided with a self-checkout lane.

Accordingly, in a first aspect of the present invention, a method of performing supervisory assistance for a self-checkout system includes sending a request for supervisory assistance from a self-checkout system to a wireless terminal, receiving the request by the wireless terminal and presenting the request with the wireless terminal.

In a second aspect of the present invention, a method of performing a supervisory function for a self-checkout system includes sending a request for supervisory assistance from a self-checkout system to a portable, handheld wireless terminal, receiving the request by the wireless terminal, presenting the request via a display provided with the wireless terminal to a supervisory individual, determining whether the assistance request can be remotely performed through input by the supervisory individual, and responding to the request through input by the supervisory individual. The input results in a response being sent from the wireless terminal to the self-checkout system, wherein the response results in the supervisory assistance being performed when the assistance request is remotely performable, and the response comprises a notification that supervisory personnel are being dispatched to a location of the self-checkout system when the assistance request can not be remotely performed.

In a third aspect of the present invention, a self-checkout system includes a self-checkout lane in communication with a wireless handheld terminal, where the wireless terminal provides wireless assistance to the self-checkout lane.

This aspect may include additional features such as:
- a plurality of self-checkout lanes;
- a plurality of wireless terminals;
- a local area network—the local area network is in communication with the self-checkout lane and the wireless terminal;
- a point-of-sale controller; and
- a boss controller.

In a fourth aspect of the present invention, a wireless terminal for providing supervisory assistance to a self-checkout system over a local area network includes a controller, a RF transceiver for sending and receiving data via radio frequencies over a wireless network, a client application operating on the controller having threads of execution for sending and receiving data via the RF transceiver to the self-checkout system, and having threads of execution for monitoring information from the self-checkout system and for responding to data received, and a display.

This aspect of the present invention may also include:
- input means including a touch sensitive screen, a keyboard, a number pad, a UPC scanner and the RF transceiver;
- a random access memory (RAM); and
- a read-only memory (ROM).

A fifth aspect of the present invention is directed to computer readable medium storing a program for performing the methods according to the above aspects.

In a sixth aspect of the present invention a set of application program interfaces (APIs) embodied on a computer-readable medium for execution on a controller of a wireless terminal in conjunction with an application program for performing supervisory functions for a self-checkout system includes a first application program interface for communicating with a self-checkout system, a second application program interface for displaying a assistance requests and status information of the self-checkout systems, and a third application program interface for responding to a the assistance requests and/or status information from the self-checkout system.

This aspect may also include a fourth application program interface allowing the wireless terminal to communicate with a second wireless terminal.

In a seventh aspect of the present invention includes a method of providing and selecting a response to a requested assistance displayed on said display in a wireless terminal for a self-checkout system having a graphical user interface including the display and a selection device includes displaying a request for supervisory assistance received from a self-checkout system, retrieving a set of possible responses to the request, and selecting one of the responses for sending to the self-checkout system.

In this aspect, the response may perform the supervisory assistance, acknowledge the request and/or a message indicating that supervisory personnel are being dispatched to a location of the self-checkout system.

DETAILED DESCRIPTION OF THE PREFERRED EMBODIMENTS

Figure 1:
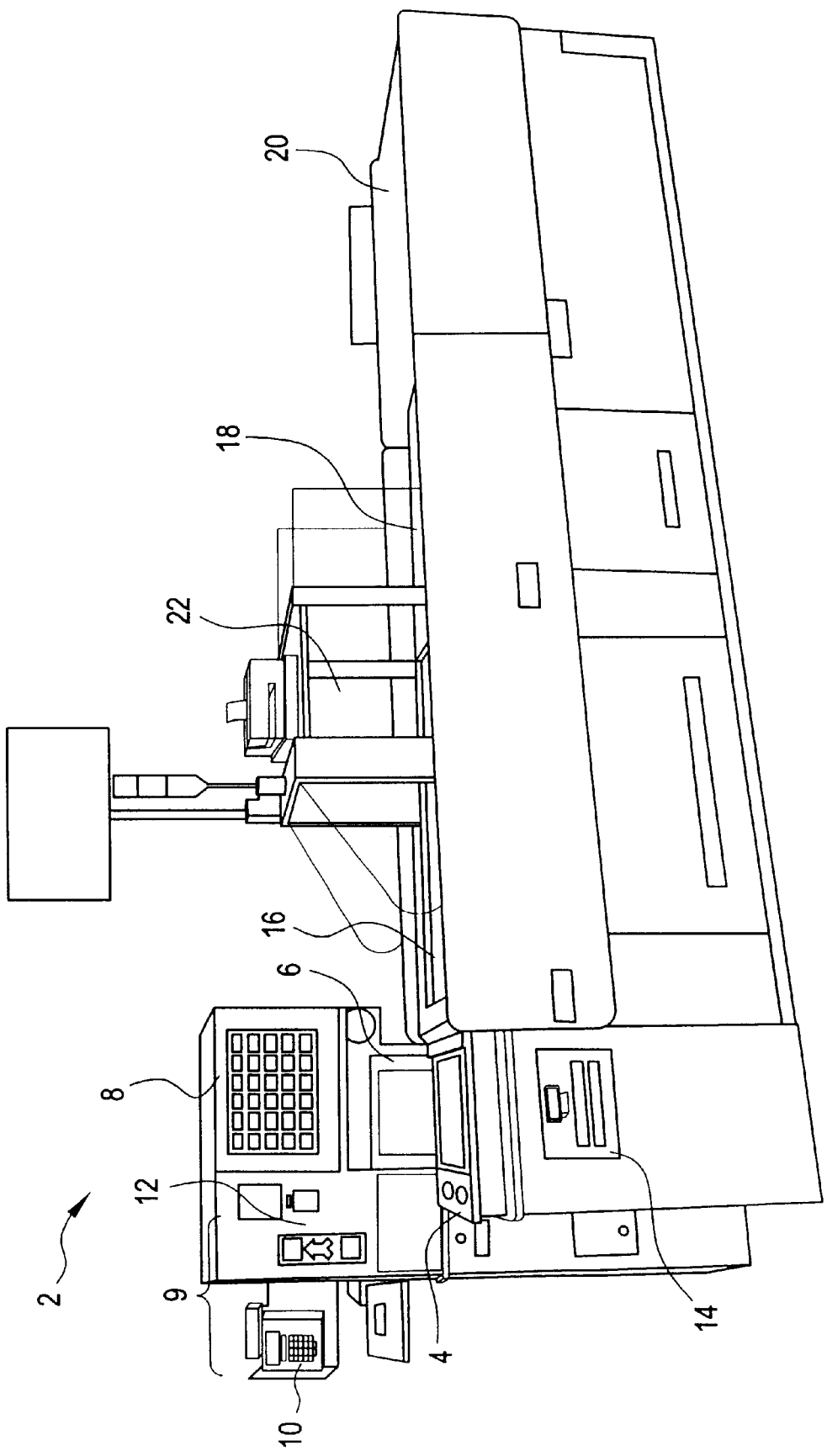
FIG. 1 illustrates a perspective view of a self-checkout lane for he wireless assisted self-checkout system according to the present invention.
Figure 2:
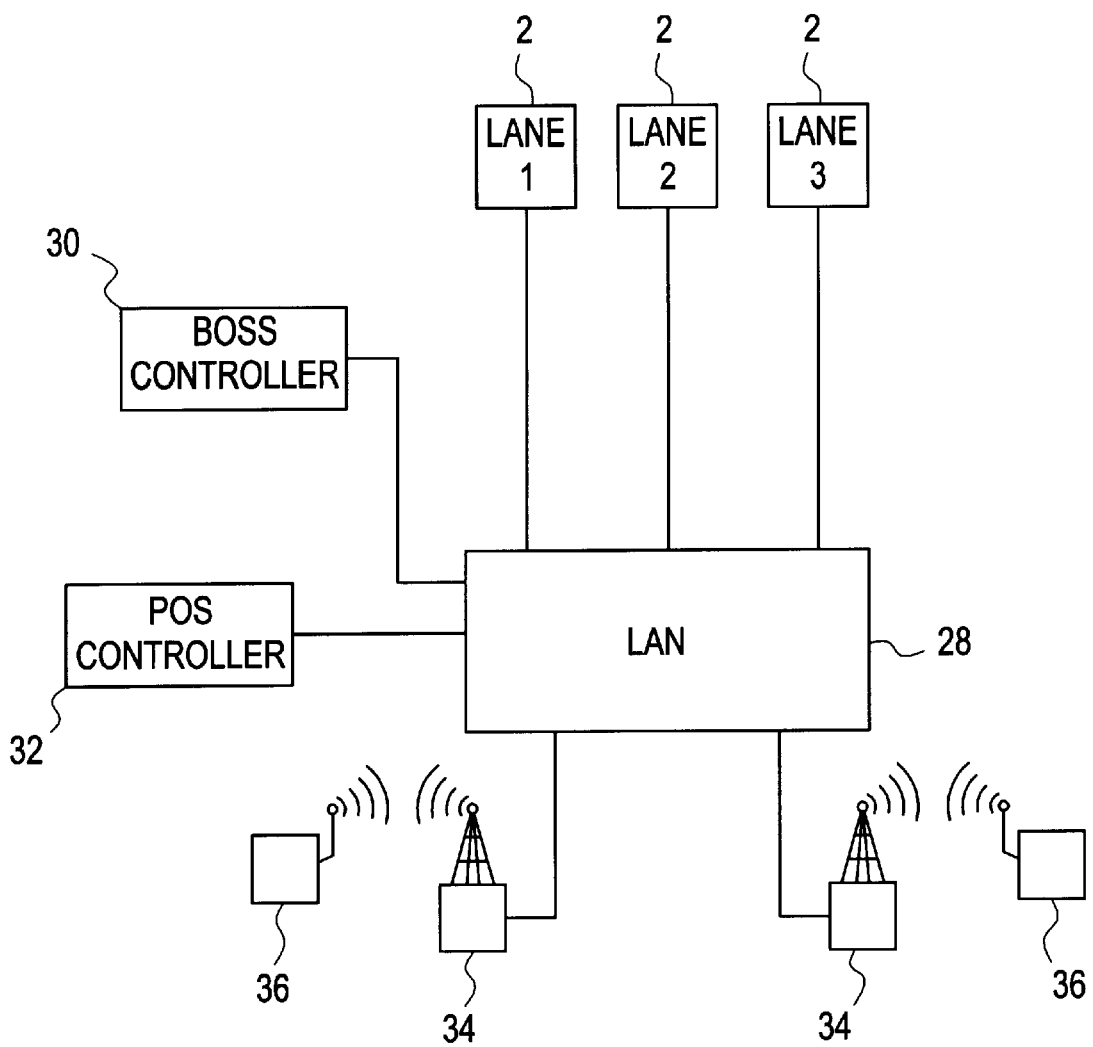
FIG. 2 illustrates a schematic diagram of the wireless assisted self-checkout system according to the present invention.
Figure 3:
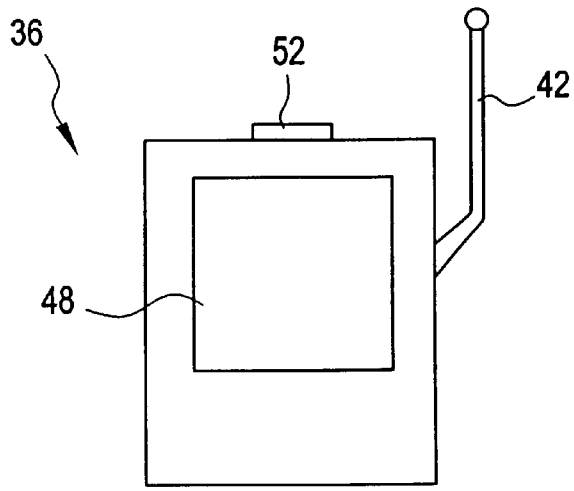
FIG. 3 illustrates a front view of a wireless handheld terminal for the wireless assisted self-checkout system according to the present invention.
Figure 4:
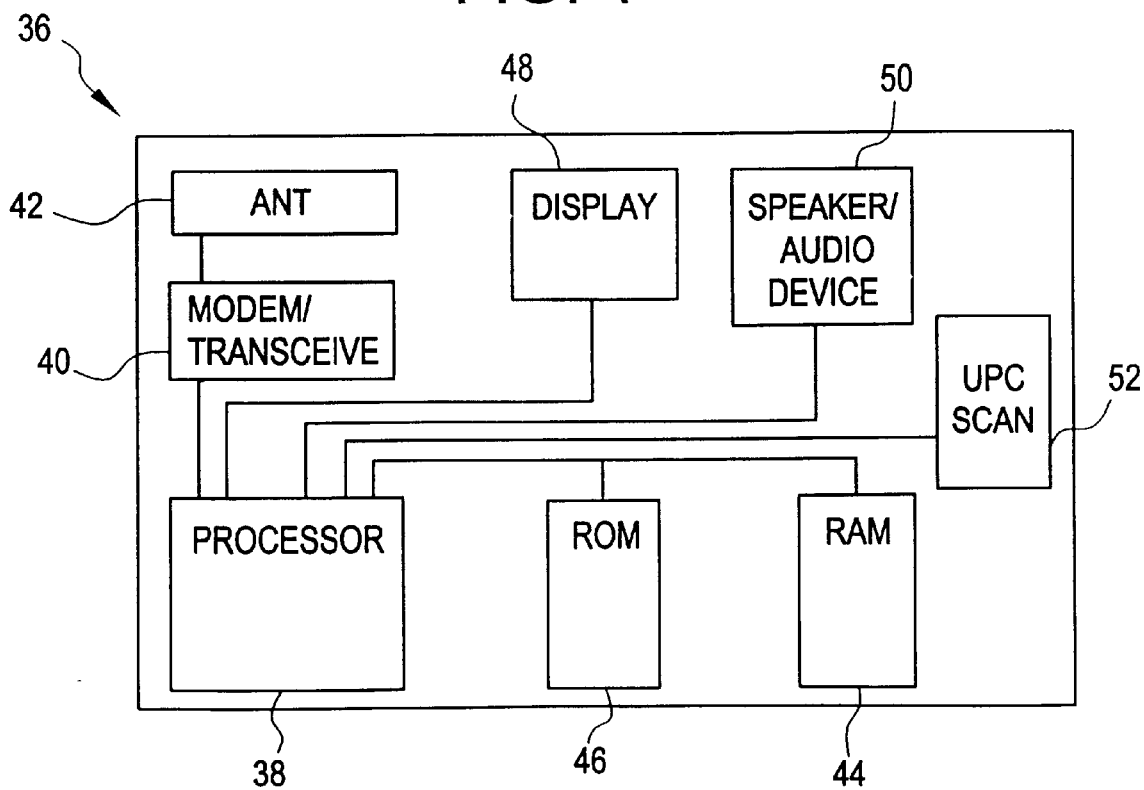
FIG. 4 illustrates a schematic overview of the hardware of the wireless terminal for the wireless assisted self-checkout system according to the present invention.

FIG. 1 is a representative illustration of a self-checkout lane 2 for the wireless assisted self-checkout system according to the present invention. Each lane includes a counter 4, a universal product code reader 6, a display screen 8 for interactive customer communication, payment mechanism 9, including credit card reader 10, cash acceptor 12 and cash dispenser 14 mechanisms, an entry conveyor 16, an out-feed conveyor 18, a bagging area 20, a tunnel 22, and a receipt unit.

The above described and illustrated lane is preferably used with a security system which uses the known weight of each item to protect against consumer fraud. Using an identification code, preferably a UPC code, the product for purchasing is scanned for purchase, which identifies the product to a UPC database. The database includes associated information about the product including price and physical parameters and dimensions including weight. After the product is scanned, it is placed on a weighing conveyor which weighs the product while transporting it to a security area. If the measured weight is within a predetermined tolerance of the weight listed for the product in the database, the item is transported to a bagging area. If the weight of the product is not within the tolerance for the weight information from the database, the conveyor is reversed and the shopper is requested to re-scan the product.

Such a system is disclosed in U.S. Pat. No. 4,676,343 (the '343 patent), the entire disclosure of which is incorporated herein by reference.

In the present invention, a plurality of such lanes 2 are linked to a local area network (LAN) 28, which is also linked with a BOSS controller 30, a Point-Of-Sale (POS) Controller 32, a transceiver 34, and a wireless terminal 36. The transceiver allows for 2-way communication between the wireless terminals and the network. This communication is preferably conducted according to TCP/IP protocol.

The BOSS controller manages database information for the lanes, i.e., all the information relating to the security aspects of the products: volume, weight, dimensions, and the like. Supervisory personnel can update this database either at the BOSS controller or they can update a copy of the database at a particular lane. Synchronizing software stored in the lane and/or BOSS controller and run at predetermined intervals, allows updated database information to be passed from each lane to the controller, then from the controller to each lane. Thus, changes implemented at one lane will ultimately pass to the copy of the database stored at the other lanes.

Supervisory personnel may also use the BOSS controller to generate sales and lane performance reports, although such reports may be setup to run at a lane. One skilled in the art will appreciate, however, that an individual lane my be configured to operate as a BOSS controller if necessary, and that the present system does not require a BOSS controller to operate.

The POS controller manages the point of sale functions of the lanes, and also manages the pricing database for products, including type 2 products, or, sold-by-weight products (i.e., meats, salads, and the like). The POS controller is in communication with each lane independently, and its operation is not impacted by the presence (or lack of) the BOSS controller.

The controllers at the lanes may also include a copy each of the pricing database from the point of sale controller as well as (as stated earlier) the security database from the BOSS controller. Thus, the lane s may operate independently of those controllers over a period of time. Preferably, however, the self-checkout system according to the present invention is operated with the point-of-sale controller and BOSS controller.

The wireless terminal according to the present invention is a handheld unit which includes a processor/controller 38, a modem (transceiver) 40 for sending and receiving data, an antenna 42, a random-access-memory (RAM) 44, a read-only-memory 46, a display screen 48, a speaker 50 (preferably) and a power source (not shown). The modem, for example, may include an IEEE 802.11b wireless LAN adaptor.

The wireless terminal may also include a bar code scanner 52 for manually entering data into the wireless terminal, so that items for purchase can be scanned/input without the use of the bar code scanner or other input means provided on the self-checkout apparatus. Furthermore, the wireless terminal may also include other input devices including, for example, a keyboard and/or a number pad, and a touch sensitive screen.

An example of such a wireless terminal which may be operated with the present invention is Symbol Technologies' PPT 2700 series wireless handheld terminal. Accordingly, the specifications for this terminal are incorporated herein by reference. One skilled in the art, however, will appreciate that the PPT-2700 is merely an illustrative example of a wireless device for the present invention, and that other handheld terminals from other manufacturers as well as custom made terminals may be configured for use with the present invention.

The wireless terminal is preferably constructed of an engineered plastic with a rugged housing so that the device can operate after drops and collisions that occur frequently in real world, retail environments. The terminal is sized so that it may be easily carried by supervisory personnel at a convenient location (e.g., waist, wrist, belt).

The wireless terminal is powered by a rechargeable/replaceable battery (preferably Li-Ion), which may be recharged and/or replaced after the battery has been drained. The wireless terminal may also include hardware for charging the battery, and/or the battery may also be charged by an external charging device.

The display of the wireless terminal is preferably a visible display screen capable of providing sufficient display lines and characters to meet the information needs of the system. It also preferably includes touch screen capabilities for data entry and response functions, although keys may be provided on the device for performing according to the present invention.

The wireless terminal may also be configured for providing and receiving sound. Specifically, the wireless terminal can inform the user of the terminal of the conditions of self-checkout apparatuses by providing a sound that informs the user of a problem. Error conditions and other problems requiring supervisory intervention at the self-checkout apparatus may be assigned a particular sound so that the user is aware of the problem without looking at the wireless terminal. Moreover, a particular error sound may be assigned a particular pitch and/or volume level for a particular self-checkout apparatus (lane). For example, a "beep" sound may be assigned to the purchase of an age restricted item. Depending upon the pitch of the sound, or the number of beeps, the user will know which self-checkout lane the message originated from. Accordingly, a first self-checkout lane may be assigned a high pitch beep for purchasing of an age restricted item, where a second self-checkout lane, may be assigned a low pitch beep for the same problem. Thus, supervisory personnel using the device could easily determine, after becoming acquainted with the terminal, the problem as well as the self-checkout lane where the problem originated from.

The wireless terminal may also be configured with voice recognition capabilities, which enables a user of the terminal to respond to a message by simply speaking to the terminal.

Figure 5:
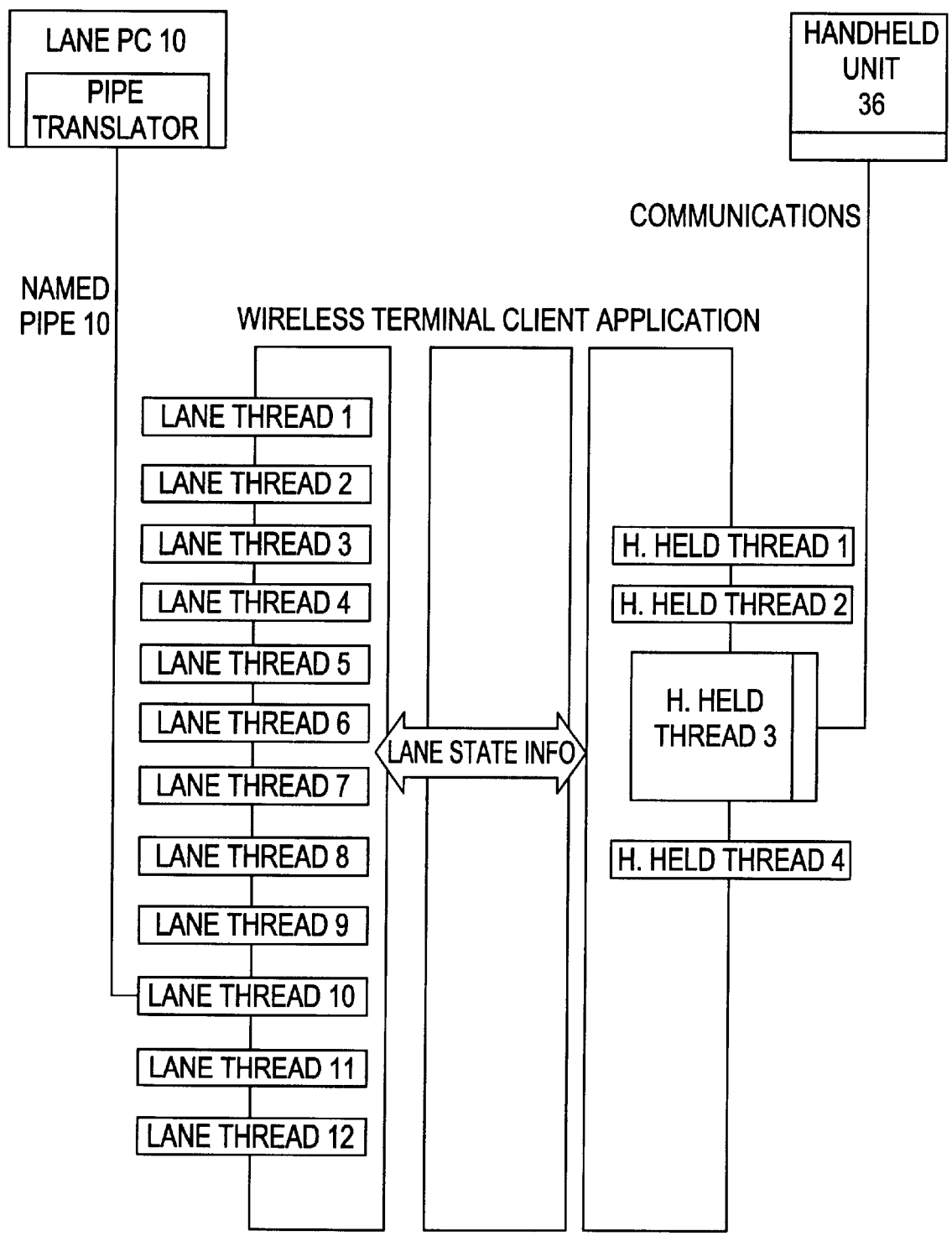
FIG. 5 illustrates a schematic view of a client application resident in the wireless handheld terminal for the wireless assisted self-checkout system according to the present invention.

A client application, resident in the wireless terminal and run on the terminal's processor/controller, performs monitoring and reporting functions of the lanes, communicating with the lanes via the LAN, and communicating with other wireless terminals directly or via the LAN. An overview of the client application software is illustrated in FIG. 5.

Accordingly, the client application includes threads of execution for each lane (e.g., Lane Thread 1 through lane thread 12), so lane information (say, for example, from Lane PC 10 communicating with the client application via Named Pipe 10) can be distinguished between lanes. The client application also includes multiple threads of execution (e.g., 1–4) for supervisory functions associated with messages received and displayed on the wireless terminal 3. The wireless terminal may be configured to provide these messages on the display screen using symbols and text instructions that are easily seen and understood by supervisory personnel.

The display screen communicates messages regarding functions requiring intervention as each occur at a specific lane. The touch sensitive screen also accepts input from supervisory personnel for responding to each message, or for general operation of the terminal.

Figure 6:
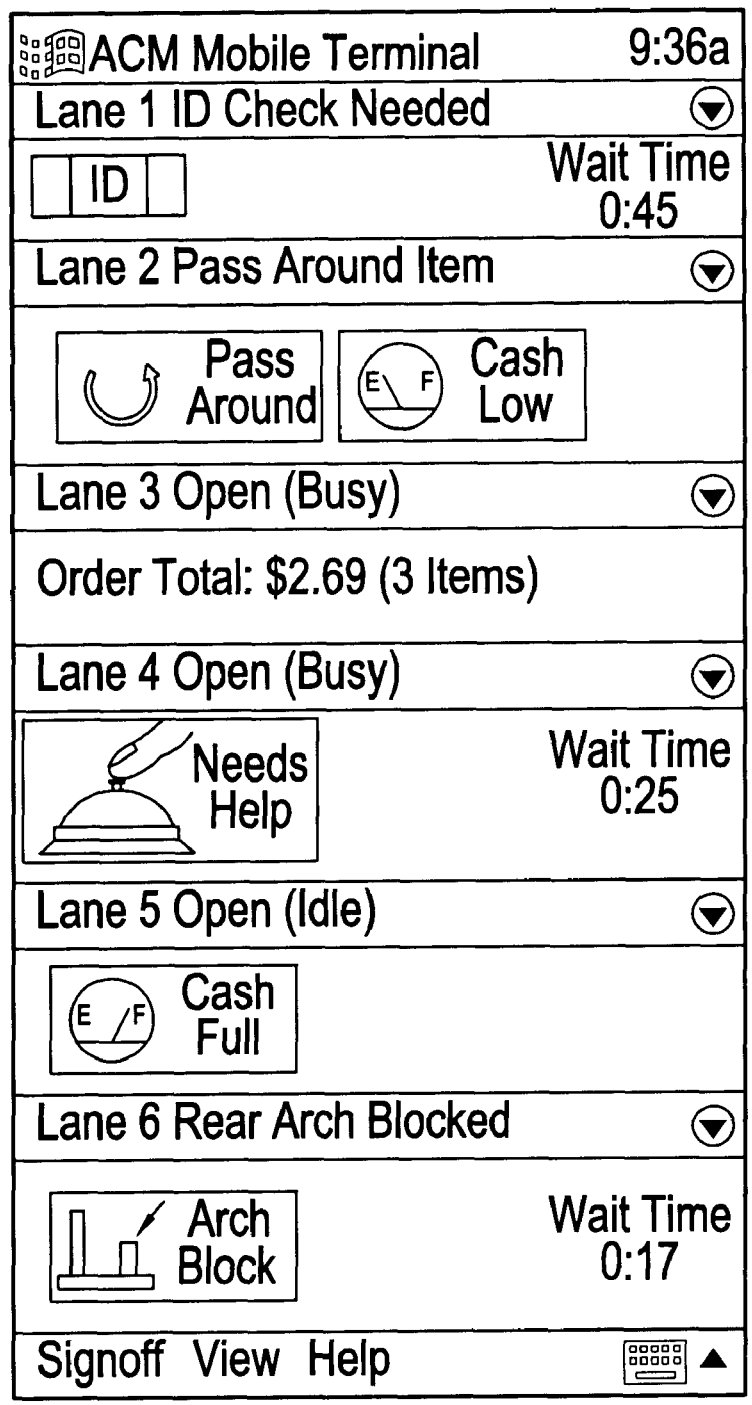
FIG. 6 illustrates a screen-shot of the wireless handheld terminal for the wireless assisted self-checkout system according to the present invention.

As illustrated in FIG. 6, the display of the wireless terminal includes a title field with a clock at the top of the display, a menu bar positioned at the bottom of the display, and a field for each of lanes 1–6. Each of the lane fields displays the status of a particular lane, with a first unresponded to message from each lane being displayed.

The lane field includes a title bar with the lane number and immediate status of the lane. The lane title bar includes a tab icon, which is a link to a next screen for displaying messages and information regarding a particular lane. When multiple messages are received, the additional messages may be viewed, as well as the associated information including the type of issue reported and the time sequence it was received. It is preferable that most of this information appear on one page (i.e., the information appears together at the same time on one screen shot). Supervisory personnel may then select one message at a time to act upon until all messages cleared.

The messages may be prioritized in any order including first received, those requiring assistance, those requiring immediate assistance, and the like. Prioritization methods may be chosen amongst a list of preset priority schemes like those discussed, or may be custom configured to a particular arrangement.

The wireless terminal communicates with lanes through the network via a RF transceiver, which sends and receives data in digital packets according to TCP/IP protocol using radio frequencies. Preferably, the wireless network is a low power digital data network transmitting between 2–3 GHz, and more preferably between 2.4–2.5 GHz.

Messages (i.e., data) is sent and received by the LAN using a RF transceiver, preferably, according to TCP/IP protocol. Depending upon the size of the store and the power of the RF transceiver, one or more RF network transceiver may be used.

Alternatively, a laptop PC computer or desktop PC computer may be used in place of the wireless terminal, requiring only an RF modem (i.e. RF transceiver) and software for emulating the client application of a wireless terminal.

The messages that may be sent to the wireless terminal include those requiring immediate shopper assistance, those relaying the status of the lane, and those reporting conditions of the lane. Shopper assistance messages can be further broken down into those which require supervisory personnel presence, and those that may be remotely address. For example, messages may be sent to the wireless terminals by the self-checkout system notifying supervisory personnel that the rear arch of the security area needs clearing, cash errors in the dispenser and acceptors including cash full/low conditions, coupon acceptor is full, shopper in need of assistance for other reasons (need help key), lane is down, lane reset, item not on file, shopper request for credit/debit/EBT transaction failed before sending, and the like.

Messages not requiring direct responses include a proximity sensor message, a message indicating the item(s) being scanned for a particular lane (for remote lane supervision), other payment required message when a debit or credit card payment was not approved, pass around item notification indicating that an item is too large to fit down the conveyor, transaction completed message for a lane where the shopper has requested payment at a service desk.

Messages may be defined by a retailer from a preset list of available options and may be defined for each preset time option defined: peak volume, low volume and overnight.

The system allows for the assignment of wireless terminals to specific lanes by a supervisory personnel using the lane controller, using the supervisory functions on the wireless device, using the point-of-sale controller, and/or using a designated central processing device (i.e., personal computer) in communication with the LAN.

The wireless terminal may also be programmed to receive and process messages from only specified lanes, and may also be programmed to handle messages from all lanes.

The system may also be configured for cross coverage, i.e., two or more wireless terminals may receive messages from the same lanes. In such an arrangement, when a supervisory person using one of the wireless terminals responds to a message from a lane, the message is removed from the message list on the other wireless terminal automatically, or alternatively, with an indication that the message has been responded to.

As illustrated in FIG. 6, the status of each lane is represented by a text message in the title bar, and an icon located in the field below the title bar. According, the lanes as shown in FIG. 6 include the following information:

| | |
|---|---|
| Lane 1 | Identification check needed. The shopper at lane 1 has attempted to purchase an age restricted item. |
| Lane 2 | Shopper has purchased an item too large to place on the conveyor; thus, the system has allowed the shopper to pass around the security zone on the conveyor and place it in the bagging area. Lane 2 has also reported that cash is low; i.e., the bill changer requires refilling. |
| Lane 3 | The lane reports that it is busy, i.e., a shopper is currently using the lane and has scanned in 3 items totaling $2.69. |
| Lane 4 | The shopper at this lane has requested an attendant. |
| Lane 5 | This lane is not presently being used, but reports that the cash acceptor mechanism is nearing capacity, thus requiring service to remove the cash (bills or coins). |
| Lane 6 | This lane reports that the rear arch of the security zone on the conveyor is blocked. |

A count-up timer may be included with each assistance request or error message which indicates the amount of time that has elapsed since the message was first received by the wireless terminal (i.e., was sent by the lane). Alternatively, a time when the message was received or sent may be used. Thus, as illustrated, the message for lane 1 was received 45 seconds before, the message in lane 4 was received 25 seconds before, and the message in lane 6 was received 17 seconds before. As each message is addressed (i.e., responded to) the count-up timer is stopped. The response time may be recorded in database on the wireless terminal or one of the controllers so that the times can be later analyzed for customer service issues.

Figure 8:
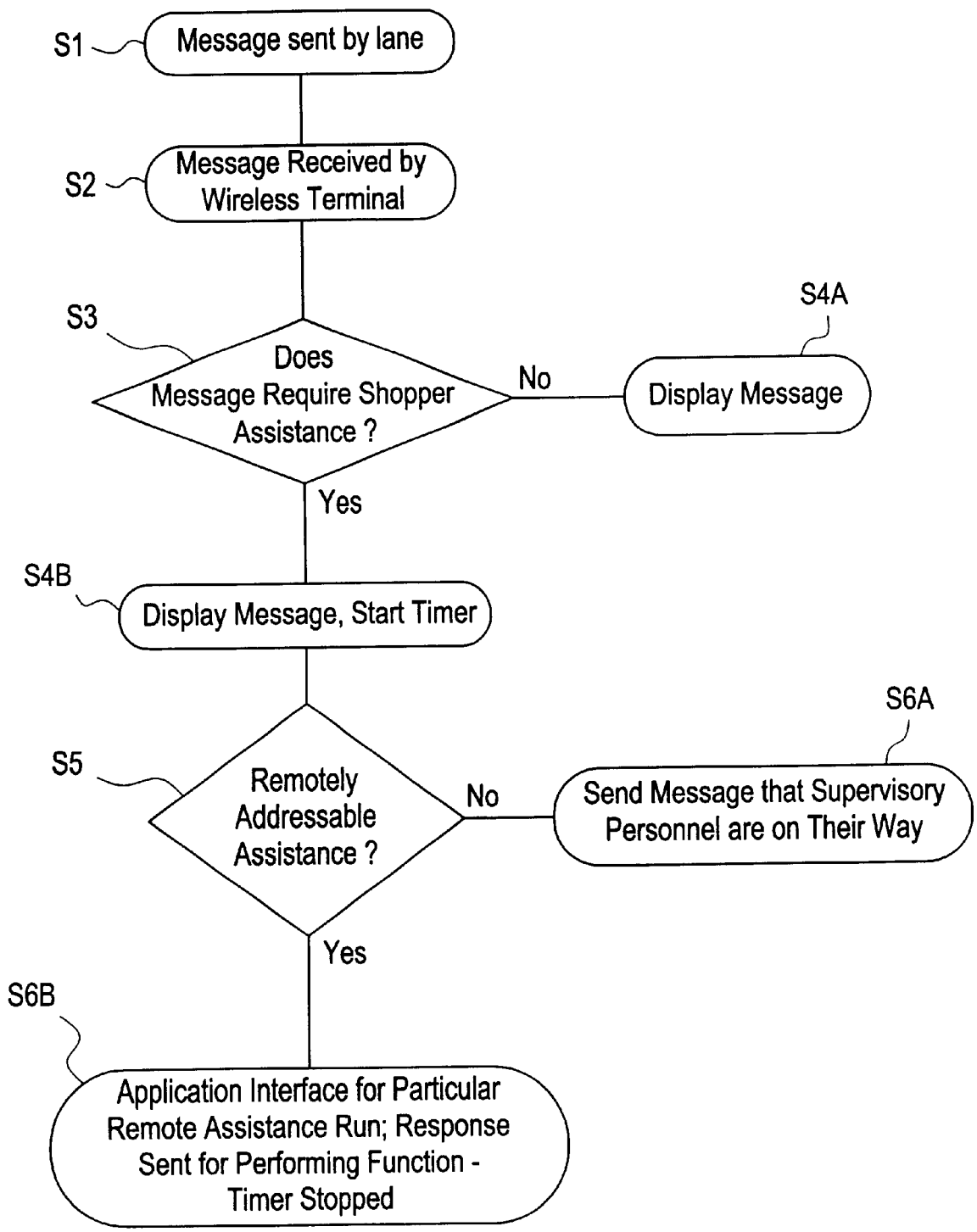
FIG. 8 illustrates a flowchart representing the process of responding to a lane communication for the wireless assisted self-checkout system according to the present invention.

FIG. 8 illustrates generally the process of wireless shopper assistance using the present invention. A message is sent by a lane via the LAN to a wireless terminal (S1). Almost immediately, the message is received by the wireless terminal (S2). If the message requires shopper assistance, then the message is displayed and a count-up timer is started (S3–S4B). If the message is merely status information of the lane or other message (not requiring shopper assistance), then the message (status) is displayed (S3–S4A). If the message is one requiring shopper assistance, then the supervisory person determines whether the assistance can be remotely performed (S5). This step may be performed by software run on the wireless terminal. If the assistance is remotely performable, then the supervisory person selects the message which activates a remote function response interface for the particular function, selects the appropriate response which results the assistance being performed (S6B). The timer is then stopped (S6B).

If the function cannot be remotely performed, the supervisory person (or equivalent function of software run on the wireless terminal) then selects the appropriate response which sends a message to the lane acknowledging the original message and/or that supervisory personnel are being dispatched the lane (S6A). The timer may be stopped when a response is sent, or may be stopped when a supervisory person gets to the lane. Remotely correctable errors may also be defined by the retailer from a list of preset options, or may be custom configured by the retailer. In addition, the terminal may be programmed with multiple settings to separate messages requiring a direct response from those provided for information reporting (e.g. status of lane).

Figure 7:
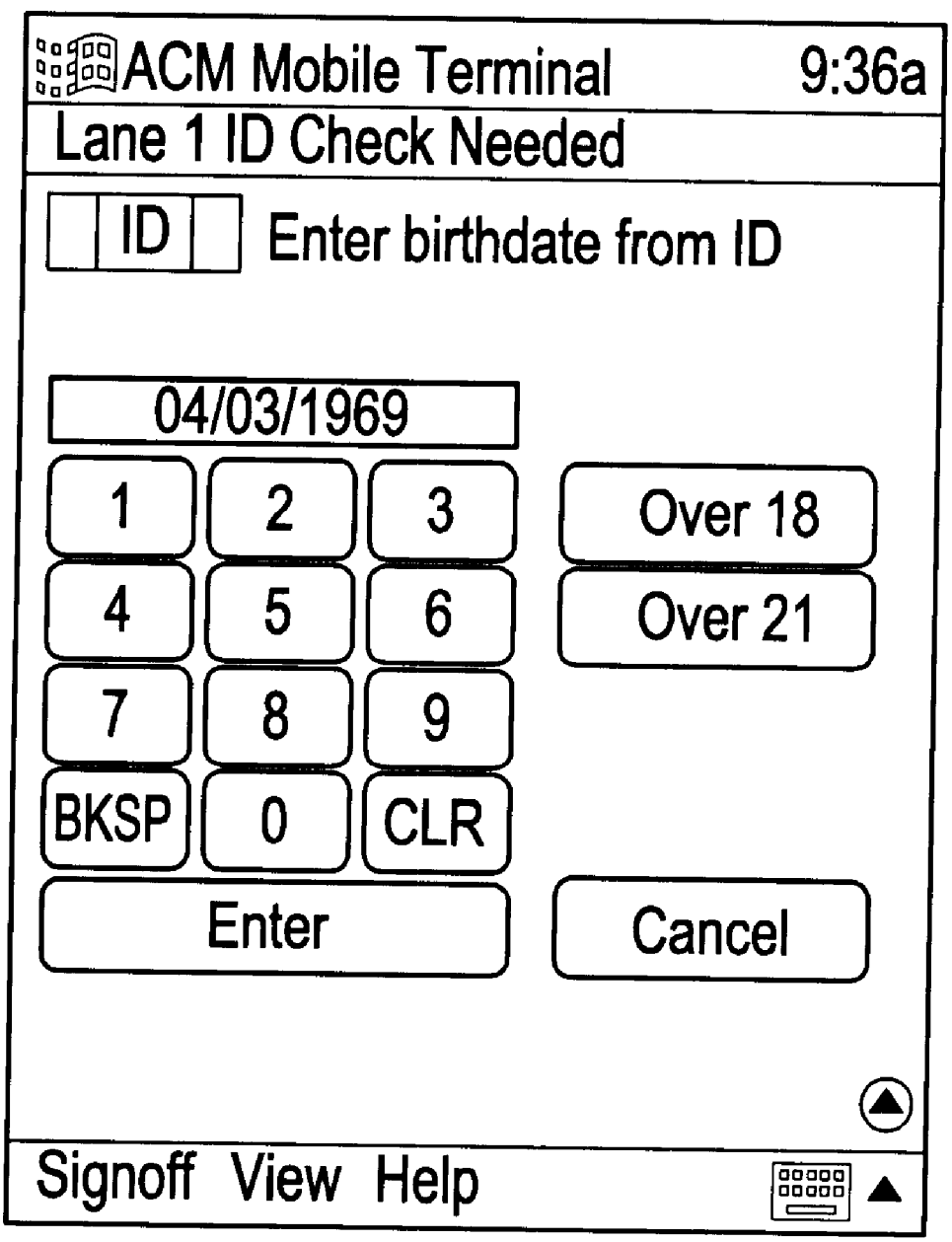
FIG. 7 illustrates a screen-shot of an age-verification interface of the wireless handheld terminal for the wireless assisted self-checkout system according to the present invention.

Supervisory personnel can select to address a particular message for a particular lane by pressing a pointing device on the icon/text representing the message. For example, if the user selected the ID icon under the lane 1 title block of FIG. 6, an Age Identification application interface (FIG. 7) is displayed. This application allows the supervisory personnel using the wireless terminal to calculate a shopper's age on that particular day by entering in the shopper's birth date (obtained from appropriate identification). If the supervisory personnel can visually determine that the shopper is of legal age to buy the age-restricted item, then the user simply selects the appropriate icon (i.e., OVER 18, or OVER 21).

As previously stated, the present invention may also be configured to provide real time information reporting (messages) to the wireless terminal regarding lane performance/status. Moreover, the wireless terminals may also be programmed to emulate point of sale functions providing for all the functionality of a lane. Thus, supervisory personnel can intervene to process miscellaneous tender such as, bottle refunds, gift certificates, rain checks, paper food stamps and WIC.

Accordingly, other application interfaces may be generated for particular messages received from the lanes. Such application interfaces include those addressing remote error correction of a lane due to weight and price errors, controller errors, notification of shopper requiring on-site assistance, item pass through for allowing a shopper to pass an item around the security system because of size considerations, and the like.

The system may also be custom configured in multiple configurations for peak volume periods, low volume periods and overnight hours.

Accordingly, the advantages of the present invention can be more clearly understood with reference to the following examples.

EXAMPLE 1

Purchase of Age Restricted Items

At 2:30 PM a shopper processing an order at lane #1 scans an age restricted item. The lane issues a message to the system via the LAN indicating that a shopper is purchasing the age restricted item. The system matches lane # to appropriate wireless terminal then sends a message to that terminal. The wireless terminal then provides an audio message, for example, three beeps, which signifies to supervisory personnel that action at the assigned lane is required. The audio signal sequence of beeps assigned to indicate that age verification is required, so the supervisory person immediately knows what action is required. The supervisory person then proceeds to get a glimpse of the shopper to see if he can determine the age of the shopper visually. If the age of the shopper cannot be verified visually, then the supervisory person must go to the lane and request identification from the shopper.

If the age of the shopper can be visually determined (e.g., 50–60 year old person), then the supervisory person selects, age verification, lane #1, time 2:30 PM, from list with the touch screen pen. The wireless terminal presents an "age verification" screen, whereby the clerk uses and attached pointing device (i.e., a pen) to touch screen box, "Over 21". The wireless device processes the screen touch and sends an age verification message back to the system, which then recognizes the transmitting device, the message and the lane number and processes the age verification approval. The shopper then concludes their shopping, pays for the items, bags the order and leaves the store.

EXAMPLE 2

Process a Returned Item

It is 5:00 PM on a Saturday and a shopper on lane #3 is processing her order and places a collard greens on the scale. The shopper processes the item correctly and when prompted places the item on the belt, however, the system returns the item due to a weight error. The system identifies a need for a message to be issued to the wireless terminal/s, and matches the lane number to appropriate wireless terminal. The system then sends the message to the wireless terminal.

The wireless terminal then provides an audio message, of two beeps, to the terminal to identify to the supervisory person that action at the lane is required. The sequence of beeps set to identify weight returns is two beeps, so the clerk knows what type of action is necessary. To address the problem, the clerk selects the weight error at lane #3 message and observes the shopper trying to reweigh the collard greens, and using the touch screen selects the item weight override icon. The system receives and processes the message allowing the shopper's second attempt at weighing their collard greens to be processed without returning.

EXAMPLE 3

Scan or Manually Enter an Item for Sale

It is 8:30 AM on a Saturday and a shopper pulls up to a lane with one carriage full of groceries and a second one with cases of soda and deli platters. The supervisory personnel stationed to observe the lanes notices the shopper and walks over to help.

On the way, the supervisory person picks up her wireless terminal and touches the "bar code scanning" button which activates the bar code scanner in the device. The shopper begin to scan his order at lane #1. The supervisory person informs the shopper that he would be happy to process the items in the second cart for them. The supervisory person then links the wireless terminal to the transaction in lane #1 by touching the appropriate keys on the wireless terminals touch screen. He then scans the deli platters and the cases of soda, each item being transmitted to the system for lane #1 and is entered as part of the order. The supervisory person then places "Paid" stickers on the items and walks the carriage to the bagging area.

The supervisory person informs the couple that they should continue with their order and thanks them for shopping at the store.

EXAMPLE 4

Cashier/Assistant Needed At Self-scanning Service Desk.

A shopper completes scanning of a number of items and touches the "Finish and Pay" icon on the display screen of a lane. At the payment selection screen, the shopper then touches "more payment " options and then at the next screen touches "pay cashier". Once this key is touched the system processes the information and sends a message to the wireless terminal. The wireless terminal receives the message and produces an audio notification of one long "beep". A supervisory person hears the extended beep and knows that there is a shopper that wants to pay at the self-checkout service counter.

The supervisory person immediately looks over each of the lanes, to see which lane and shopper needs to proceed to the self-checkout service counter. Once the lane is known, the supervisory person will proceed over to appropriate lane, help the shopper with their order, and walk them to the self-checkout service counter.

While the system of the present invention has been described with reference to the check-out counters of a supermarket, it should be apparent to those skilled in the art that the system can be applied to any distribution system wherein articles bearing individual media that contain identification data are to be maintained under control.

Having described the invention with reference to the presently preferred embodiments, it should be understood that numerous changes in construction may be introduced without departing from the true spirit of the invention as defined in the appended claims.

What is claimed is:

1. A method of performing supervisory assistance for a self-checkout system, comprising:

sending a request for supervisory assistance from a self-checkout system to a wireless terminal;

receiving said request by said wireless terminal; and presenting said request with said wireless terminal, wherein a timing of a response by a user of said wireless terminal is presented with said request.

2. The method according to claim 1, wherein said request for supervisory assistance comprises a request for performing a supervisory function.

3. The method according to claim 2, wherein said function comprises a request for a point of sale function of said self-checkout system.

4. The method according to claim 1, wherein said wireless terminal is a portable device.

5. The method according to claim 1, wherein said wireless terminal is a handheld, portable device.

6. The method according to claim 1, wherein said request is presented by said wireless terminal visually.

7. The method according to claim 9, wherein said request is presented visually by an LCD display.

8. The method according to claim 9, wherein said request is presented visually via a LED.

9. The method according to claim 1, wherein said request is presented by said wireless terminal by sound.

10. The method according to claim 1, wherein said request is presented by said wireless terminal by vibration.

11. The method according to claim 1, wherein said assistance request comprises a request for authorizing a purchase of an age-restricted item.

12. The method according to claim 1, wherein said assistance request comprises a request for entering items or coupons for a purchasing transaction via said wireless terminal.

13. The method according to claim 1, wherein said assistance request comprises an item pass through request for allowing a scanned item to avoid a security area of said self-checkout system.

14. The method according to claims 1, wherein said assistance request comprises a request to override an error condition of said self-checkout system.

15. The method according to claim 1, wherein a plurality of requests are received by said wireless terminal, each request being associated with a particular self-checkout system.

16. A method of performing supervisory assistance for a self-checkout system, comprising:
    sending a request for supervisory assistance from a self-checkout system to a wireless terminal;
    receiving said request by said wireless terminal; and
    presenting said request with said wireless terminal;
    responding to said request through input via said wireless terminal by a supervisory personnel.

17. The method according to claim 16, wherein prior to sending said response, said method comprises determining whether said assistance can be remotely performed through input by said supervisory individual, wherein said response is sent to said self-checkout system when said function can be remotely performed.

18. The method according to claim 17, wherein said response comprises an acknowledgment of said request and is sent from said wireless terminal to said self-checkout system when said requested assistance can not be remotely performed.

19. The method according to claim 18, wherein said response notifies said self-checkout system that supervisory personnel have been dispatched to a location of said self-checkout system.

20. A method of performing a supervisory function for a self-checkout system, comprising:
    sending a request for supervisory assistance from a self-checkout system to a portable, handheld wireless terminal;
    receiving said request by said wireless terminal;
    presenting said request via a display provided with said wireless terminal to a supervisory individual;
    determining whether said assistance request can be remotely performed through input by said supervisory individual; and
    responding to said request through input by said supervisory individual, said input resulting in a response being sent from said wireless terminal to said self-checkout system, wherein said response results in said supervisory assistance being performed when said assistance request is remotely performable, and wherein said response comprises a notification that supervisory personnel are being dispatched to a location of said self-checkout system when said assistance request can not be remotely performed.

21. A self-checkout system comprising a self-checkout lane in communication with a wireless handheld terminal, said wireless terminal providing wireless assistance to said self-checkout lane and comprising a display, wherein said display displaying a request for supervisory assistance to a user of said wireless terminal and also displaying a timing of a response by said user.

22. The self-checkout system according to claim 21, wherein said system includes a plurality of self-checkout lanes.

23. The self-checkout system according to claims 21 or 22, wherein said system includes a plurality of wireless terminals.

24. The self-checkout system according to claim 21, further comprising a local area network, wherein said local area network is in communication with said self-checkout lane and said wireless terminal.

25. The self-checkout system according to claim 24, further comprising a point-of-sale controller in communication with said local area network.

26. The self-checkout system according to claim 25, further comprising a boss controller in communication with said local area network.

27. The self-checkout system according to claim 21, wherein said wireless terminal includes a UPC scanner.

28. The self-checkout system according to claim 21, wherein said wireless terminal includes input means.

29. The self-checkout system according to claim 28, wherein said input means comprises a touch sensitive screen.

30. The self-checkout system according to claim 28, wherein said input means comprises a keyboard.

31. A wireless terminal for providing supervisory assistance to a self-checkout system over a local area network, comprising:
    a controller;
    a RF transceiver for sending and receiving data via radio frequencies over a wireless network;
    a client application operating on said controller having threads of execution for sending and receiving information via said RF transceiver to said self-checkout system, and having threads of execution for monitoring information from said self-checkout system and for responding to information from said self-checkout system; and
    a display.

32. The wireless terminal according to claim 31, further comprising input means.

33. The wireless terminal according to claim 31, further comprising a random access memory (RAM).

34. The wireless terminal according to claim 31, further comprising a read-only memory (ROM).

35. The wireless terminal according to claim 32, wherein said input means comprises said display having a touch sensitive screen.

36. The wireless terminal according to claim 32, wherein said input means comprises a keyboard.

37. The wireless terminal according to claim 32, wherein said input means comprises a number pad.

38. The wireless terminal according to claim 32, wherein said input means comprises a UPC scanner.

39. The wireless terminal according to claim 32, wherein said input means comprises said RF transceiver.

40. A computer readable medium storing a program for performing a supervisory function for a self-checkout system, comprising:

sending a request for supervisory assistance from a self-checkout system to a portable, handheld wireless terminal;

receiving said request by said wireless terminal;

presenting said request via a display provided with said wireless terminal to a supervisory individual;

determining whether said assistance request can be remotely performed through input by said supervisory individual; and responding to said request through input by said supervisory individual, said input resulting in a response being sent from said wireless terminal to said self-checkout system, wherein said response results in said supervisory assistance being performed when said assistance request is remotely performable, and wherein said response comprises a notification that supervisory personnel are being dispatched to a location of said self-checkout system when said assistance request can not be remotely performed.

41. A set of application program interfaces embodied on a computer readable medium for execution on a controller of a wireless terminal in conjunction with an application program for performing supervisory functions for a self-checkout system, comprising:

a first application program interface for communicating with a self-checkout system;

a second application program interface for displaying assistance requests and status information of said self-checkout systems; and a third application program interface for responding to said assistance requests and/or status information from said self-checkout system.

42. The set of application programs according to claim 41, further comprising a fourth application program interface allowing said wireless terminal to communicate with a second wireless terminal.

43. In a wireless terminal for a self-checkout system having a graphical user interface including a display and a selection device, a method of providing and selecting a response to a requested assistance displayed on said display, the method comprising:

displaying a request for supervisory assistance received from a self-checkout system;

retrieving a set of possible responses to said request; and selecting one of said responses for sending to said self-checkout system.

44. The method according to claim 43, wherein said response performs said supervisory assistance.

45. The method according to claim 43, wherein said response is an acknowledgment of said request.

46. The method according to claim 43, wherein said response is a message indicating that supervisory personnel are being dispatched to a location of said self-checkout system.

* * * * *